United States Patent [19]

Pusic

[11] Patent Number: 4,900,906
[45] Date of Patent: Feb. 13, 1990

[54] AUTOMATED FUEL PUMP CONTROLLING SYSTEM

[76] Inventor: Pavo Pusic, Moluntska 6, Dubrovnik, Yugoslavia, 50000

[21] Appl. No.: 228,028

[22] Filed: Aug. 4, 1988

[51] Int. Cl.⁴ .............................................. G06F 7/08
[52] U.S. Cl. .................................. 235/381; 235/382.5; 902/22
[58] Field of Search ................ 235/381, 382.5; 902/22

[56] References Cited

U.S. PATENT DOCUMENTS

| | | | |
|---|---|---|---|
| 3,931,497 | 1/1976 | Gentile | 235/381 |
| 4,629,871 | 12/1986 | Scribner | 235/375 |
| 4,780,601 | 10/1988 | Vermesse | 235/375 |

*Primary Examiner*—Harold I. Pitts

[57] ABSTRACT

An automated system for controlling a fuel dispensing pump is disclosed. The system comprises debit card vending apparatus, said apparatus comprising automated means for accepting the payment either in cash, credit or IC cards, means for automated verifying of said payment methods and means for issuing a system's debit card, and gasoline pump controlling apparatus, said apparatus comprising automated means for controlling the operation of said fuel pump activity according to information obtained from said system's debit card. Means to allow a user of said debit card vending apparatus to enter required information are also provided. In accordance with the invention, two said apparatuses are located separately, each having its own microprocessor for controlling the tasks to be performed.

5 Claims, 25 Drawing Sheets

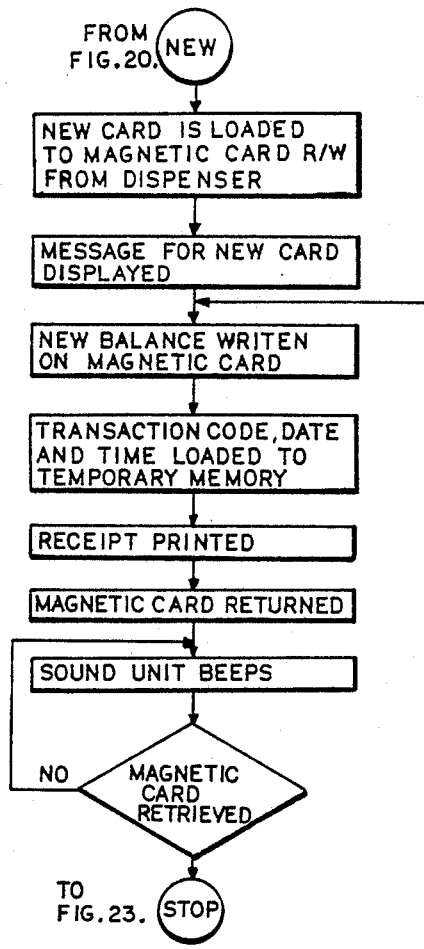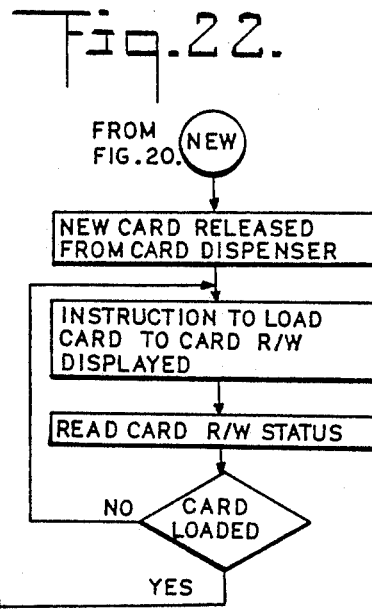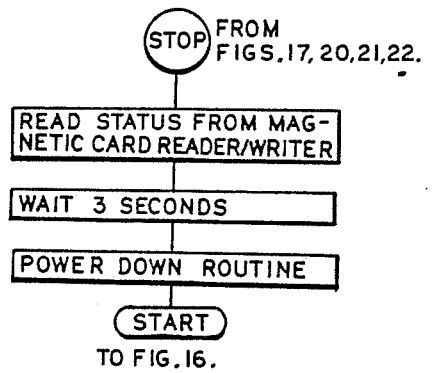

AUTOMATED FUEL PUMP CONTROLLING SYSTEM

BACKGROUND OF THE INVENTION

1. Field of the Invention

The present invention relates to automated control systems and, more particularly, to a system which controls a gasoline dispensing pump without the involvement of a human operator.

2. Description of the Prior Art

In today's society, gasoline is an essential commodity which has to be widely and readily available for use as energy source in most automobiles, other vehicles and various other machines employing internal combustion engines. Typically, a customer obtains gasoline at a "gasoline station", a facility which has gasoline stored in big tanks and has gasoline dispensing pumps which accurately meter the amount of gasoline leaving the tank and being obtained by a customer. After the gasoline dispensing procedure the customer pays the amount of gasoline dispensed.

In the prior art, the process of dispensing gasoline requires a human operator to both physically dispense the gasoline and collect the appropriate payment.

Furthermore, the prior art contains many instances of "self-service" gasoline stations. In these self-service stations, the customer acts as the human operator responsible for placing the hose nozzle into the container opening and for monitoring the amount of gasoline dispensed. A separate human operator, an employee at the gas station, collects the appropriate payment and then determines the amount of the gasoline to be dispensed. The self-service approach reduces the amount of employees at the gasoline station but some employees are required at all times when the gasoline station is open for business.

Moreover, this approach requires the amount of gasoline to be determined in advance and the customer has to estimate how much gasoline can be loaded into car tank which usually results either with a not fully loaded tank or a complicated procedure to obtain the overcharged amount.

Nevertheless, there are many situations in which it is desirable that no employee be required to be present when the gasoline station is open for business. For example, the gasoline station may have little business during the late night/early morning hours. The gasoline station operator may want to keep the station open for business during these hours, but the cost of paying the employees may prohibit this. Additionally, there may be additional costs during this period to assure employee's safety. Similarly, gasoline stations in remote areas may be very desirable but economically prohibitive.

The prior art discloses certain automated systems that may be adapted to provide the functions of determining the value of the gasoline dispensed and collecting the appropriate payment, but they were never applied for this purpose because their expenses exceeded the cost of employees. Thus, these devices are economically prohibitive and the few known devices, wherein certain amount of fuel can be purchased for certain amount of inserted cash, were never applied on a large scale because of too many limitations in consideration to safety of inserted cash, customer's convenience and unsuitable mechanical structure.

Furthermore, possibility for payment by credit card, existing nowadays at almost each gasoline station, requires presence of an employee because such payment procedure is not performed by automated means.

Therefore, it is to be concluded that no device disclosed in the prior art allows a gasoline station to be completely automated while giving the customer required flexibility in the mode of payment, either in currency, credit cards and/or IC cards and having a favorable economical aspect, which will become apparent from further description and drawings showing the present invention as for preferred embodiment.

SUMMARY OF THE INVENTION

The primary object of the present invention is to provide an economical control system for gasoline dispensing pumps which automates the task of determining the value of the gasoline dispensed and collecting the appropriate payment. Another object of the present invention is to provide a control system for gasoline dispensing pumps which automates the task of determining the value of the gasoline dispensed and collecting the appropriate payment, and allows for the customer to make payment either by currency, credit cards or IC cards.

Briefly, the present invention comprises a system that has (1) a device to read and verify currency, credit cards and IC cards, and to issue magnetically encoded system's debit cards for an indicated amount, and (2) a device to read and verify the magnetically encoded system's debit cards and to control the dispensing of gasoline from the gasoline pump up to amount encoded on the system's debit card strip.

Automated magnetic cards dispenser (AMCD) is the magnetic card vending machine which accepts cash or different kinds of credit or IC cards for purchase of said system's debit cards. The machine has the ability to automatically encode different data on the magnetic strip of said system's debit card previously dispensed from its magnetic card dispensing unit. The encoded data may comprise any desired type of company identification and any amount of money (within reasonable limits) either inserted into bill acceptor/validator or charged from customer's credit or IC card, according to customer instruction entered on a keyboard unit.

In addition to these two possible ways for purchase, the AMCD has the ability to encode said data either on newly dispensed system's debit card or on already used one, adding the newly paid amount to its existing (previously purchased and not consumed) balance. This results in minimal waste of said system's debit cards and prevents any loss of money for customer in case of misjudgment of how much fuel can be loaded into the car tank.

Once purchased, encoded or re-encoded, said system's debit card is then inserted into the Gasoline Pump Debit Card Reader (GPDCR) for automated purchase of fuel. The GPDCR, located separately from the AMCD (i.e., mounted on each gasoline dispensing unit), is able to check the validity of all data encoded on said system's debit card's magnetic strip and activate the pump's electronic vending unit, according to the instruction stored in its memory.

It is to be mentioned that said system's debit card can be used for purchase of other goods sold on gasoline station (i.e., motor oil containers, canned beverages, etc.), if said goods are loaded into vending machines with ability to accept payment by said system's debit card.

The ability of the bill acceptor/validator in AMCD unit to evaluate each inserted bill and the ability of both card reader/writers (one in AMCD and one in GPDCR) to check the validity of any inserted debit, credit or IC card eliminates the possibility of fraud and enables the automation of the entire process with the highest possible level of security.

Furthermore, according to the process of the invention, unless valid said system's debit card with credit greater than zero is inserted in GPDCR unit, nobody can remove pump's dispensing nozzle or get any fuel out of the pump, which further eliminates any reasonable possibility to jeopardize safety of said pump.

As implied from the above description, the present invention comprises two physically separated units, the AMCD and the GPDCR.

The principal object of the invention is to entirely automate the purchasing procedure at any gasoline station with the highest possible level of security, both for customer and gasoline station operator. The present invention enables the customer to choose any desired amount of purchase (within certain reasonable limits) by making the payment either with one-, five-, ten-, or twenty-dollar bills, or by charging any of the customer's credit or IC cards. It also enables the customer to reuse the once bought system's debit card infinitely at any gasoline station of the same company. Purchasing the system's debit card or adding the credit to an existing said card, either by cash, credit or IC card, the customer is automatically given a receipt for any newly paid or charged amount.

The present invention enables fuel companies to operate unmanned self-service gasoline stations maintaining the highest possible service and security standards.

It is assumed that only one AMCD is needed at each station and that said AMCD is built in a hard embodiment, preferably in the existing concrete wall of the station's office building, with access to the machine's internal housing only from its rear side, so that there is no reasonable possibility for any kind of robbery from an outsider.

It is also assumed that one GPDCR is mounted on each gasoline dispensing unit to control pouring of fuel through one pump's nozzle. The fuel pours as long as credit on said system's debit card is greater than zero and pump automatically stops when said credit equals zero. If fuel pouring is stopped before said credit equals zero, remaining credit is rewritten on said card for some future use. In addition, simply by inserting said system's debit card into the GPDCR's magnetic card reader/writer the customer can check its existing balance on a GPDCR's liquid crystal display.

All relevant data can be stored into the AMCD's memory and, when using communication units, all separate units (AMCD and all of GPDCRs on the same station) can communicate with each other or with any external database. There may be a few different modes for storing or forwarding the relevant data and for mode of communication which will depend on operator's desire and standards, and which will not significantly influence manufacturing version of the invention.

It should be emphasized that AMCD can be manufactured in two versions, as explained in detail in the "Preferred Embodiment" section, while the GPDCR has only one version.

All features and advantages of the present invention will become apparent from the following brief description of drawings and description of the preferred embodiment.

BRIEF DESCRIPTION OF THE DRAWINGS

FIGS. 16 to 23 are flow charts showing the process of the AMCD;

DESCRIPTION OF THE PREFERRED EMBODIMENT

Figure 1:
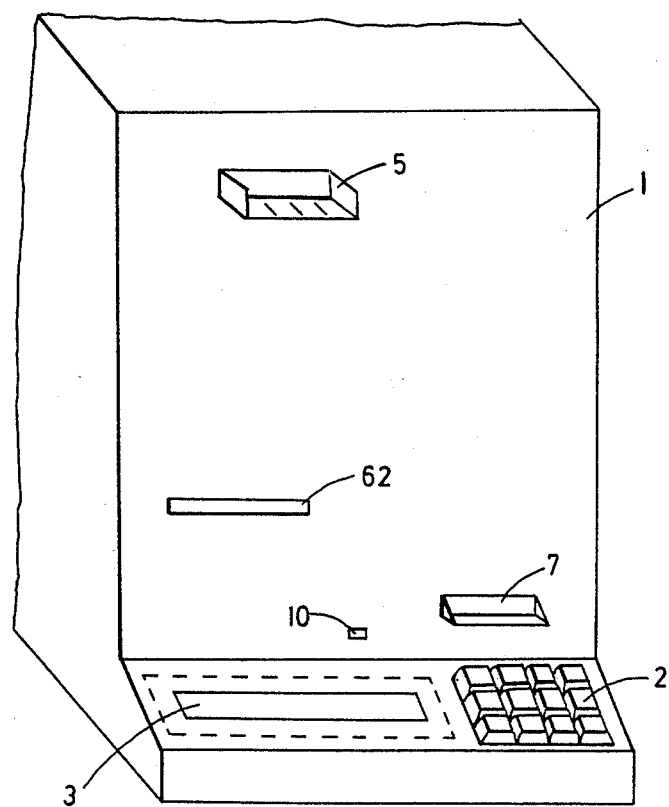
FIG. 1 is the perspective view of the AMCD housing for "version one", showing the outside arrangement as for preferred embodiment.
Figure 6:
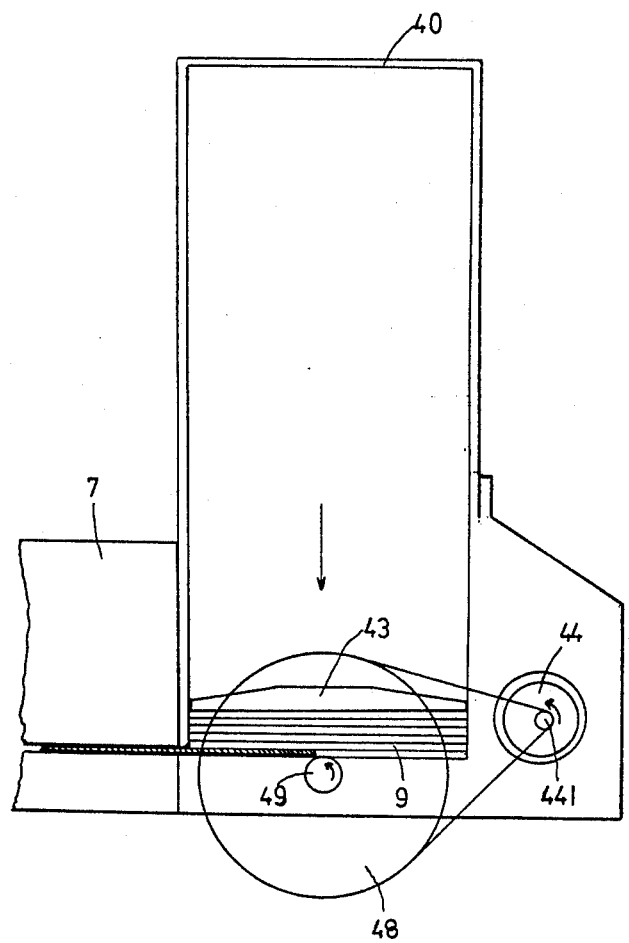
FIG. 6 is the right side view of the magnetic card dispensing unit's interior for "version one", showing the (magnetic) system's debit cards and the way they are dispensed into magnetic and IC cards reader/writer.

Referring to the FIG. 1, there is shown the AMCD housing 1, as for "version one", comprising keyboard input unit 2, liquid crystal display (LCD) 3, front placed photosensor 10, opening for the printed receipts 62, exterior parts of bill acceptor/validator 5 and magnetic and IC card reader/writer 7. The machine housing 1, shown on FIGS. 1, 2 and 3 for "version one", and on FIGS. 8, 9 and 10 for "version two", should be made of metal in box shape with opening 11 in the back, as shown on FIGS. 2 and 3, and 9 and 10. Said opening 11 which covers the entire rear side of said housing 1 enables general maintenance of the machine which includes refilling of system's debit cards 9, shown on FIGS. 6 and 12, refilling of printing paper in printer feeding mechanism 61 and refilling of ribbon in the printer 6, shown on FIGS. 2 and 9.

Figure 3:
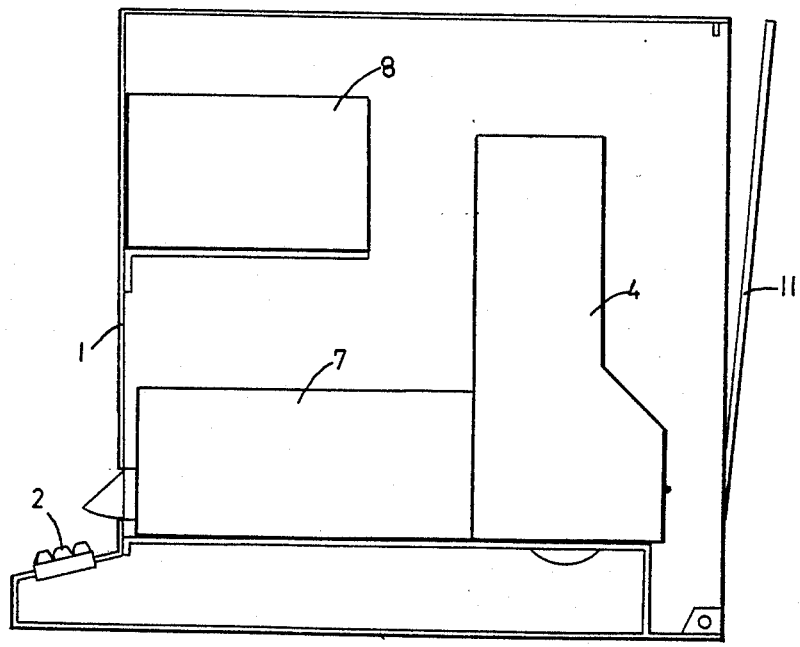
FIG. 3 is the right side view of the AMCD housing for "version one", showing the arrangement of the units located in this side of the machine as for preferred embodiment.
Figure 9:
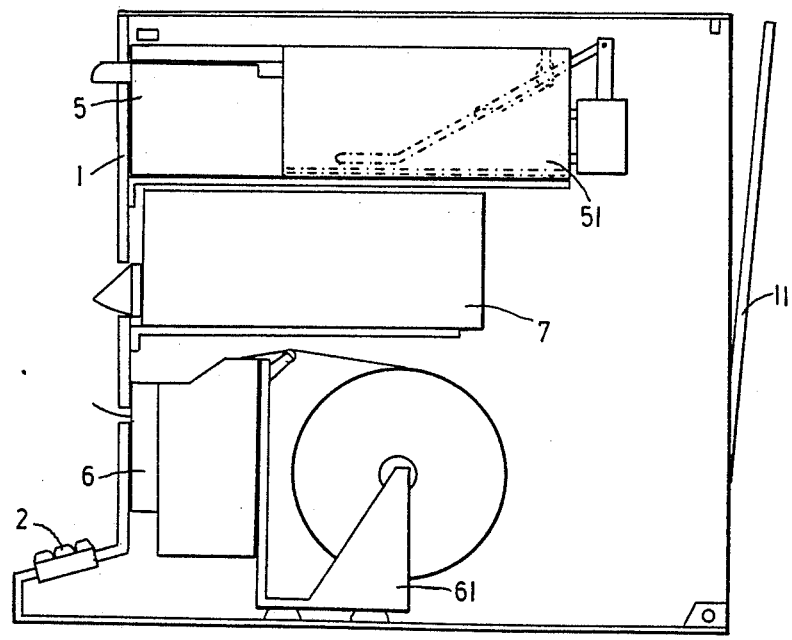
FIG. 9 has the identical description as FIG. 3 but for "version two"

Referring to FIGS. 3 and 9, there is shown motor driven magnetic and IC card reader/writer 7 which is able to read and validate credit and IC cards, and to read, validate and encode magnetic debit cards. Said reader/writer 7 has ability to load any inserted credit or IC card, read data from the card and return said card. When system's debit card is loaded from its rear side, as in the present invention for "version one", said reader/writer 7 writes data on its magnetic strip and drives card out to customer. When the system's debit card is inserted from its front side, either one with already existing data on its magnetic strip or one without any data encoded (as in the present invention for new system's debit card in "version two") said reader/writer 7 drives said card inside, reads and erases data from its magnetic strip and CPU 12 loads said data into temporary memory unit 16 for further use. Said reader/writer 7 writes new data (new balance and company identification) which are obtained from CPU 12 while driving said card out to customer. Company identification must be encoded to prevent use of said card in some other similar system. As shown on FIGS. 3 and 10, the basic difference between two said manufacturing versions of AMCD is the position of said reader/writer 7 and magnetic card dispensing unit 4 which is for "version one" shown on FIG. 3, adjacent with its front side on the rear side of said reader/writer 7, and for "version two" shown on FIG. 10, built in front wall of the machine housing 1. The difference in system's debit card's 9 dispensing procedure will be explained later in this description.

Figure 2:
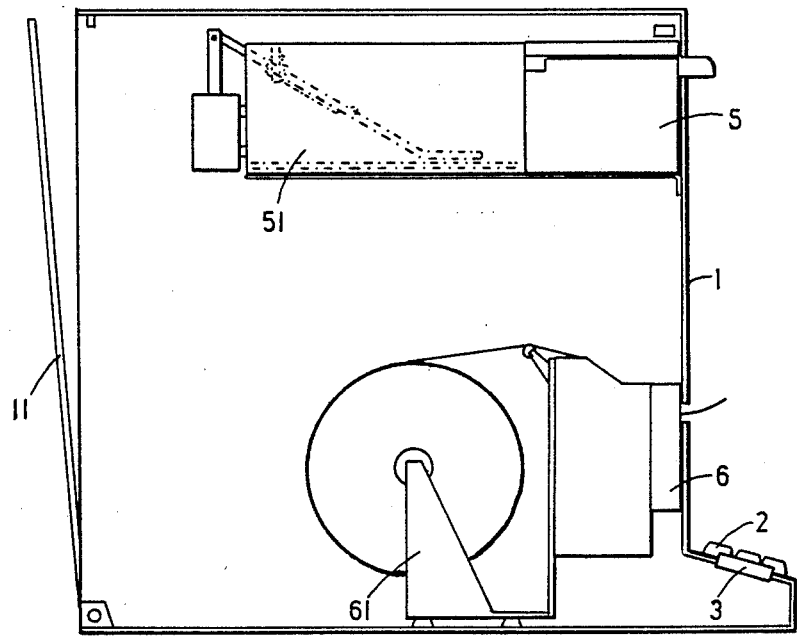
FIG. 2 is the left side view of the AMCD housing for "version one", showing the arrangement of the units located in this side of the machine as for preferred embodiment.
Figure 4:
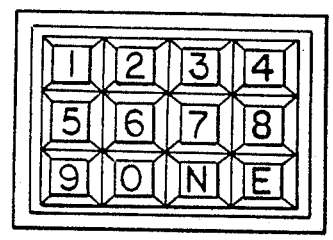
FIG. 4 is the plan view of the keyboard input unit, which is identical for both versions.

Referring to FIG. 2, there is shown a left side view of the machine housing 1 for "version one", showing the exact location of this side's integral parts which include bill acceptor/validator 5 with bill storage 51 adjacent on said bill acceptor/validator, and printer 6 with its paper feeding mechanism 61 which are both mounted on a mutual base and can be moved backwards when paper or ribbon refilling is required. Liquid crystal display (LCD) 3, shown on FIGS. 1 and 8, can display messages up to 80 characters (in two lines) in size of 3.20 mm×4.15 mm. Keyboard input unit 2, shown on FIGS. 1, 4 and 8, has ten numeric and two alphabetic keys for entering the instructions to machine's central processing unit (CPU) 12.

Referring to FIG. 3, there is shown the right side view of machine housing 1 for "version one" which comprises magnetic cards dispensing unit 4, motor driven magentic and IC card reader/writer 7, keyboard input unit 2 and control box 8. Said control box 8 comprises CPU 12, permanent memory unit 13, clock/calendar unit 14, communication unit 15, temporary memory unit 16, sound unit 17, sensor and switching unit 18 and control box for the bill acceptor/validator 5 which is integral part of said bill acceptor/validator 5 but may be located separately.

Figure 10:
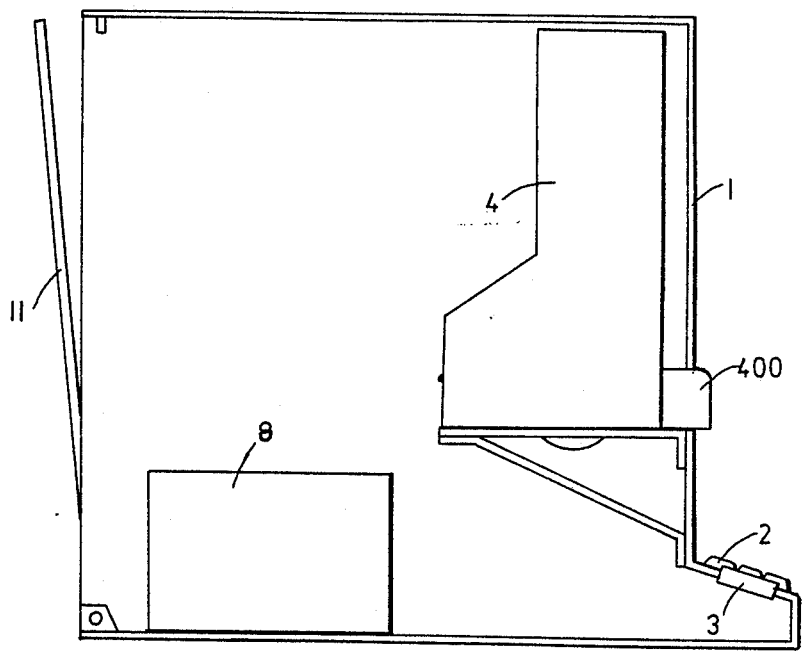
FIG. 10 has the identical description as FIG. 2 but for "version two"

Referring to FIGS. 9 and 10, there are shown the same machine's units as on FIGS. 2 and 3 but with the different arrangement as proposed for "version two".

Figure 8:
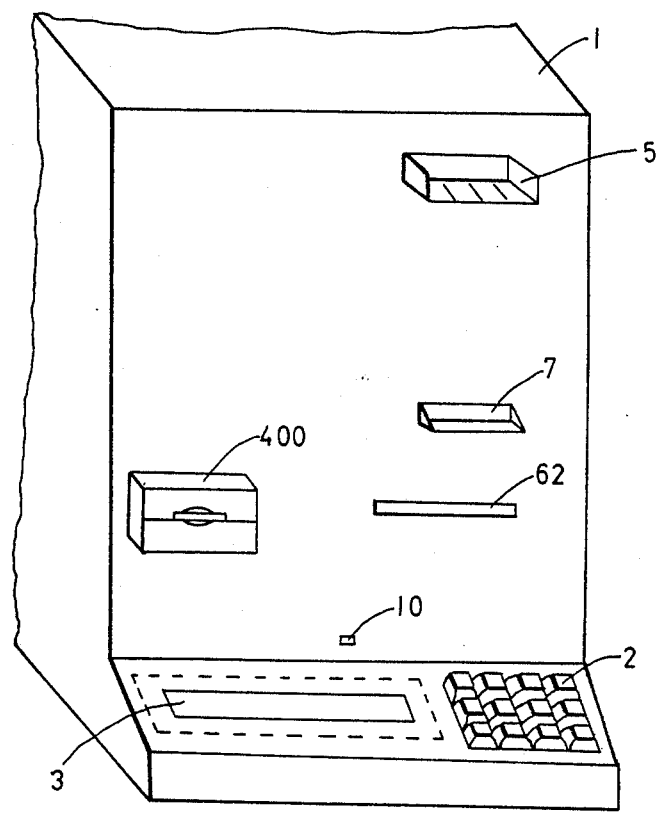
FIG. 8 is the perspective view of the AMCD housing for "version two"
Figure 16:
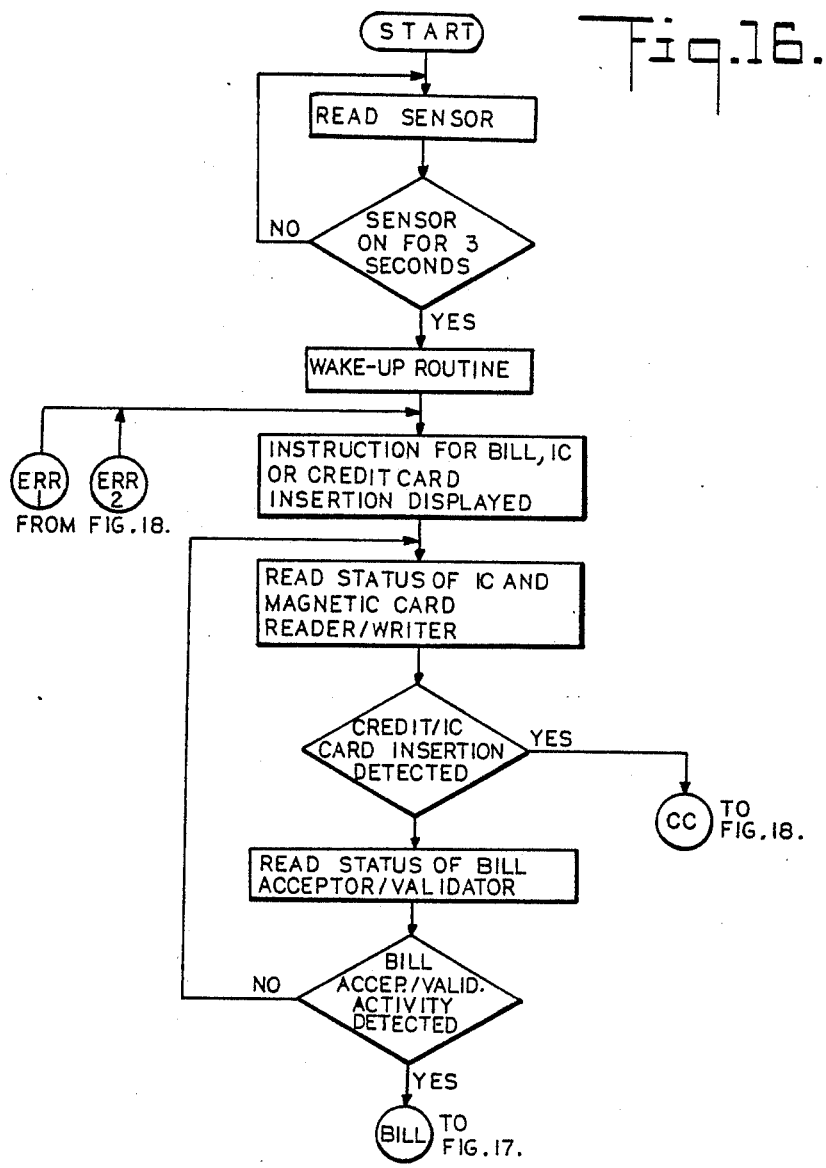

As shown on FIG. 16, between two operation procedures all machine's functions, except the function of sensor and switching unit 18 are shut-down and when front-placed photosensor 10, shown on FIGS. 1 and 8, detects a customer presence in proximity of said machine housing 1 for longer than three seconds the wake-up routine is invoked. The CPU then displays instructions on machine's LCD 3 for insertion of bills, credit or IC card. As shown on FIGS. 16 and 18 there are two possible paths to continue the operation within this procedure. The path chosen depends on the instructions which the CPU 12 receives from one of the loading sensors, either one in the bill acceptor/validator 5 or one in the card reader/writer 7.

Figure 17:
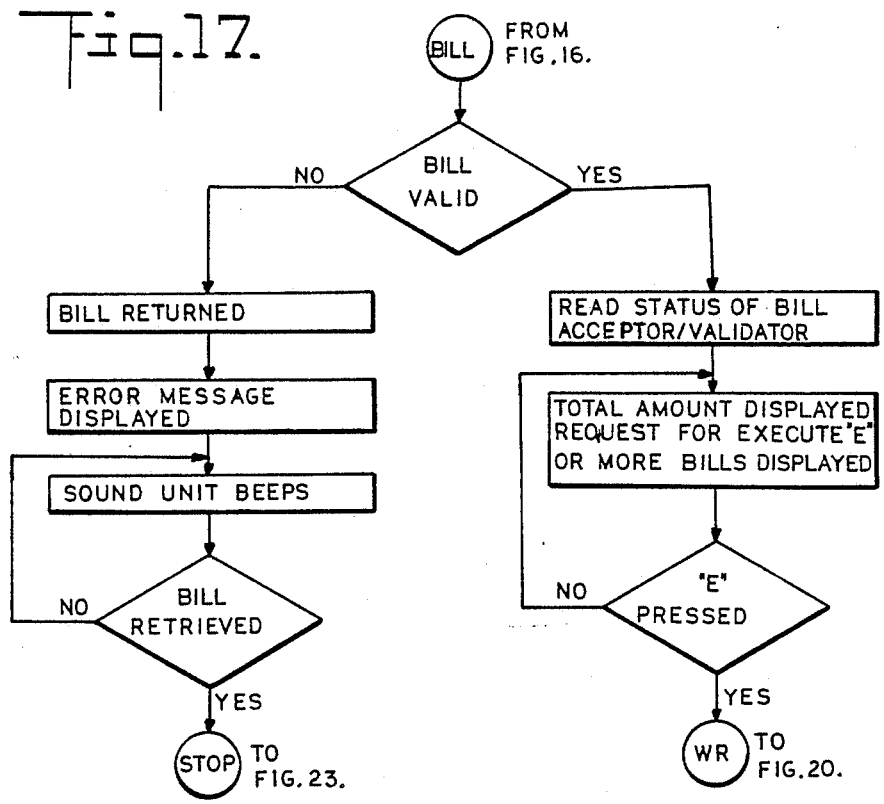

As shown on FIGS. 16 and 17, if the bill acceptor/validator's 5 loading sensor detects an incoming bill, its loading mechanism drives said bill inside and checks its validity. If said bill is not valid it returns the bill, CPU displays error message on LCD 3 and sound unit 17 beeps to warn the customer to retrieve said bill. As also shown on FIG. 17, if inserted bill is valid, the bill acceptor/validator 5 drives said bill through and loads it into the bill storage 51, while indicating to CPU 12 the inserted amount which is then displyed on LCD 3 together with request for confirmation that the bill insertion procedure is completed which customer performed by pressing the "E" key on the keyboard 2. When "E" key is pressed, data about total inserted amount are loaded into temporary memory unit 16 and machine continues procedure as shown on FIG. 20 and explained later in this description, after the description on how credit or IC card charging procedure is performed.

Figure 18:
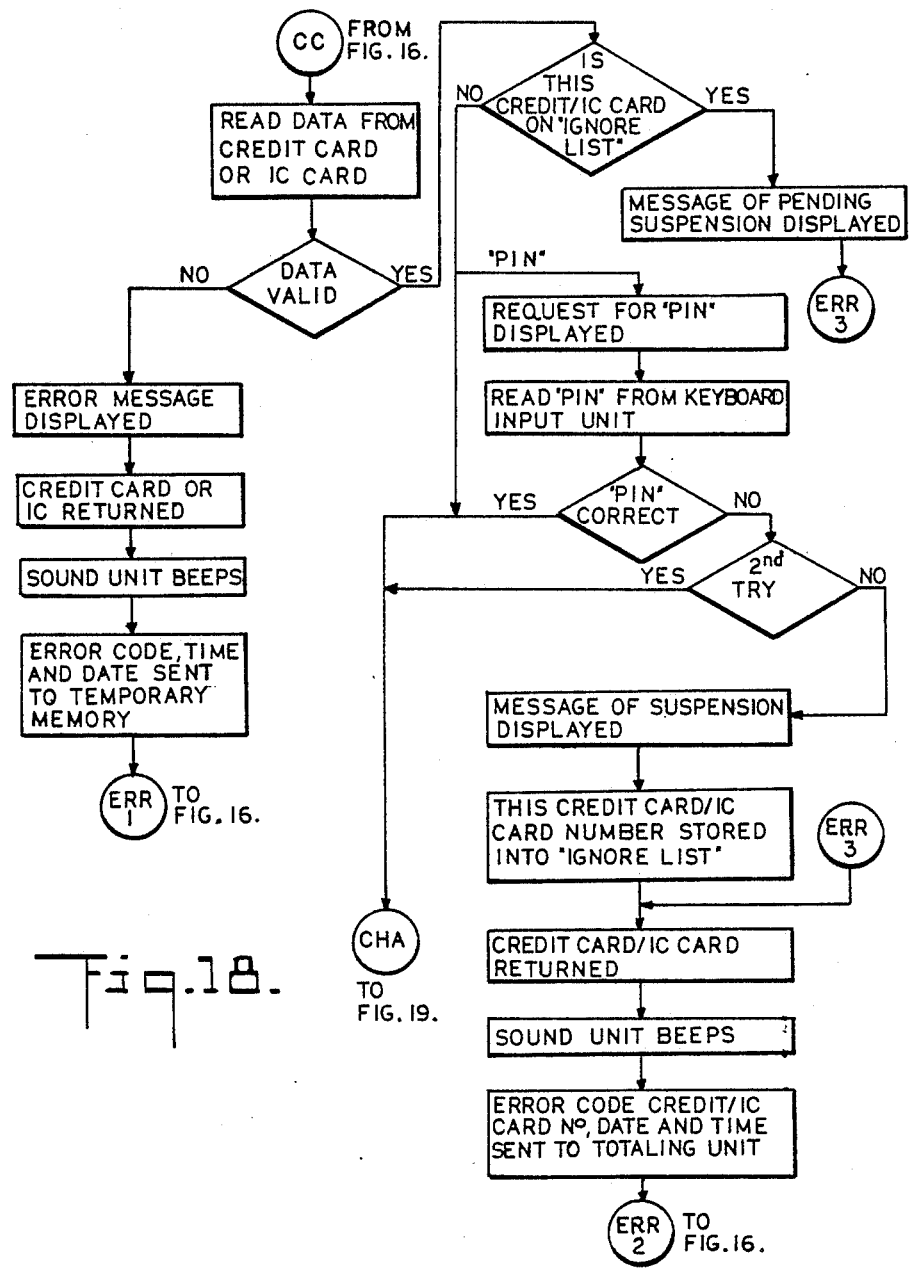

Referring to FIGS. 16 and 18, if the card reader/writer's 7 loading sensor detects the insertion of credit or IC card of any type, its driving mechanism drives said card inside and reads encoded data from said card's magnetic strip. As shown on FIG. 18, card validity is checked and if card proves not to be valid or is of a type which cannot be used on said gasoline pump, CPU 12 displays error message and the reader/writer 7 returns the card. If said card is valid and of a type which can be used on said station, CPU 12 further checks if said card is on "ignore list" and in such case message of suspension is displayed and the card returned as shown in FIG. 18, but if said card is not on the "ignore list", the procedure is continued by identifying if said card is one with or without a personal identification number (PIN). If said card is one without PIN, the procedure is continued as shown on FIG. 19, but if said card is one with PIN, request to enter the PIN is displyd on LCD 3 and customer has to enter correct PIN in two tries on the keyboard 2. If correct PIN is not entered after the second try, card returning procedure shown on FIG. 18 is applied. If correct PIN is entered after first or second try, machine continues the procedure, as shown on FIG. 19, by displaying request for desired charge (within given reasonable limits) which has to be entered on the keyboard 2 by customer.

Figure 19:
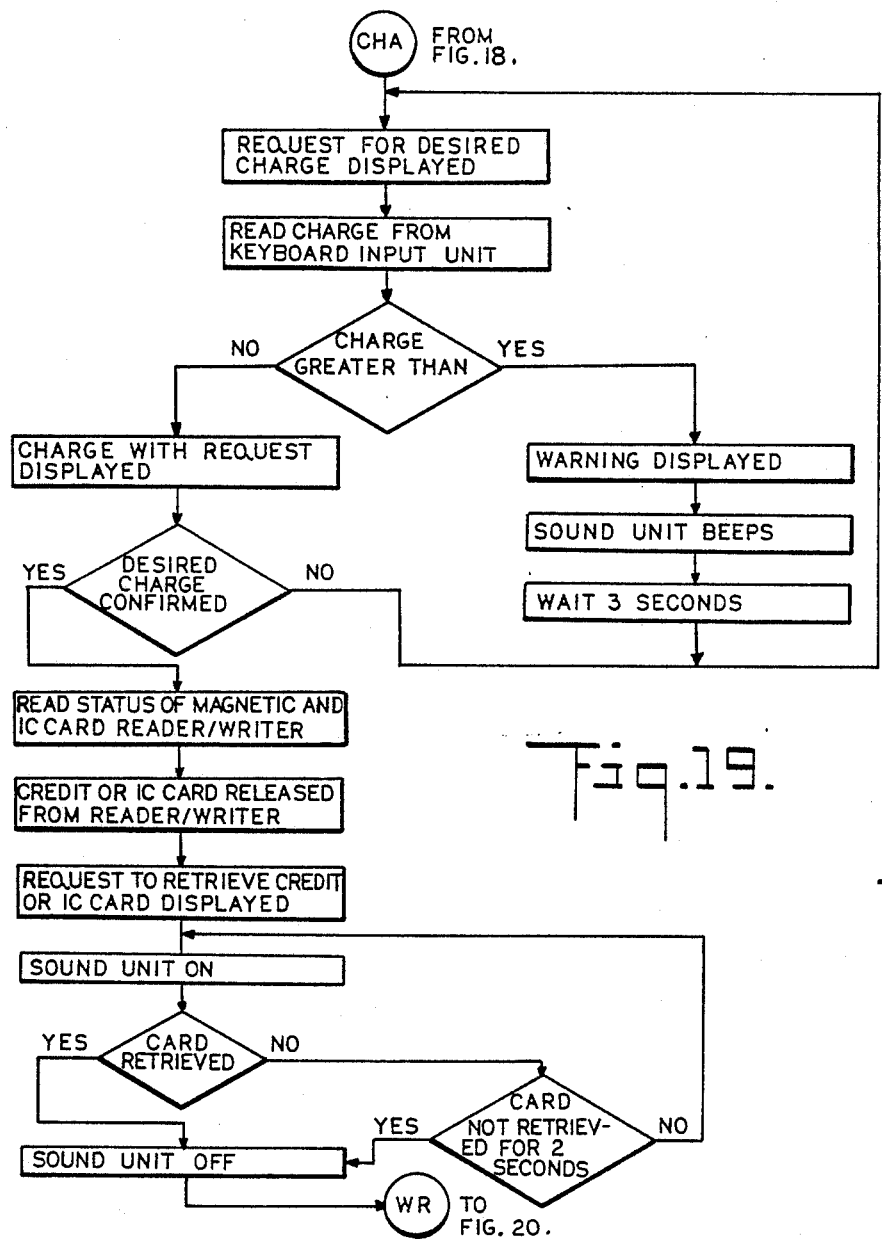

If entered request is not within said limits, warning is displayed and the procedure continued by displaying said request again as shown on FIG. 19. Referring to FIG. 19 again, if entered charge is within said limits, such charge is displayed together with request for confirmation of such charge which customer performs by pressing "E" key on the keyboard 2. When charge is confirmed, data about said card and corresponding charge are loaded into machine memory or forwarded to some externally connected database, and said card is relased from the reader/writer 7 according to the procedure shown in FIG. 19.

Figure 20:
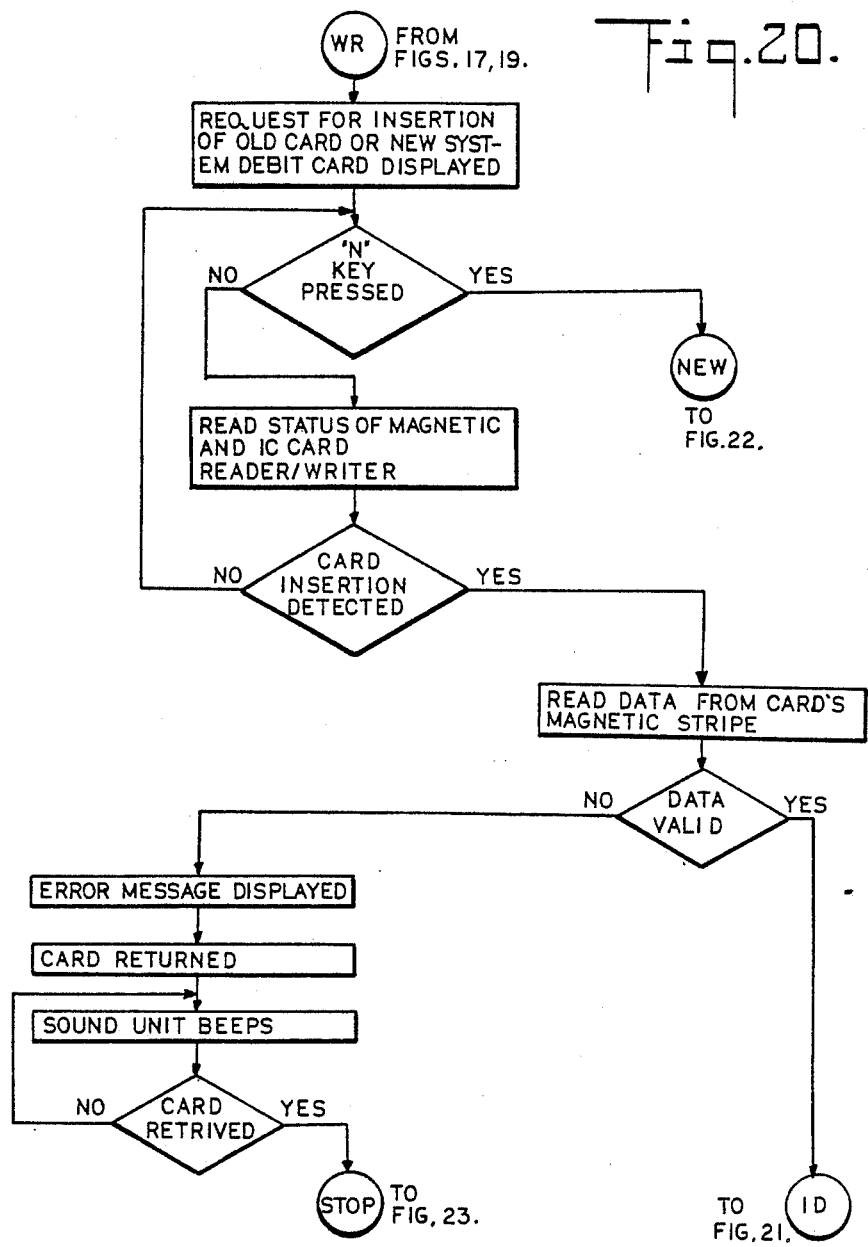

As shown on FIG. 20, the procedure is further continued (regardless of previously applied payment procedure. i.e., cash or card) by displaying the request for insertion of an already used system's debit card 9 or entering the requests for a new system's debit card.

Figure 5:
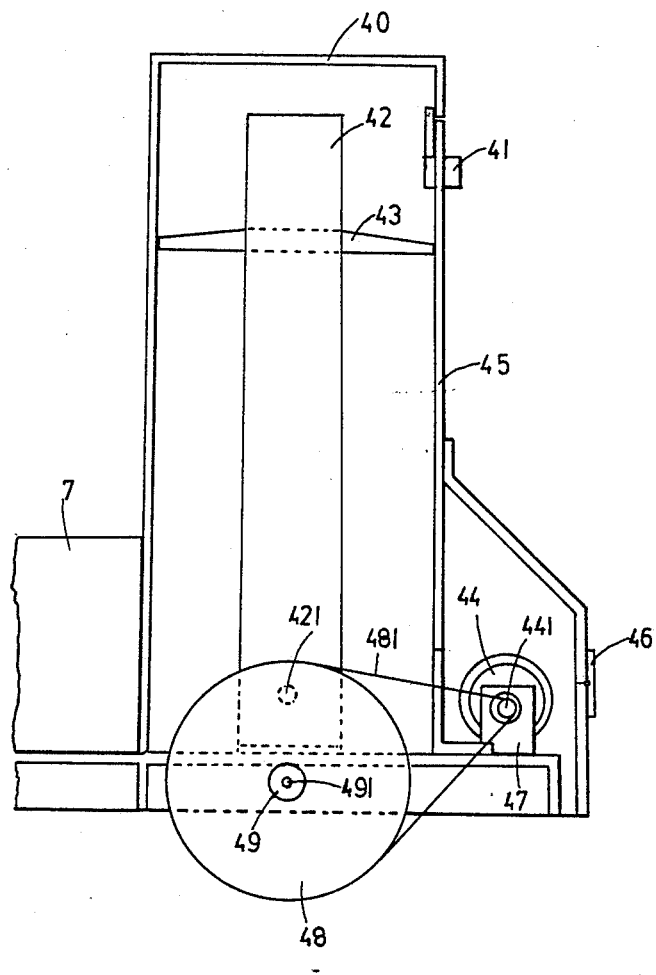
FIG. 5 is the right side view of the magnetic card dispensing unit's housing for "version one"
Figure 11:
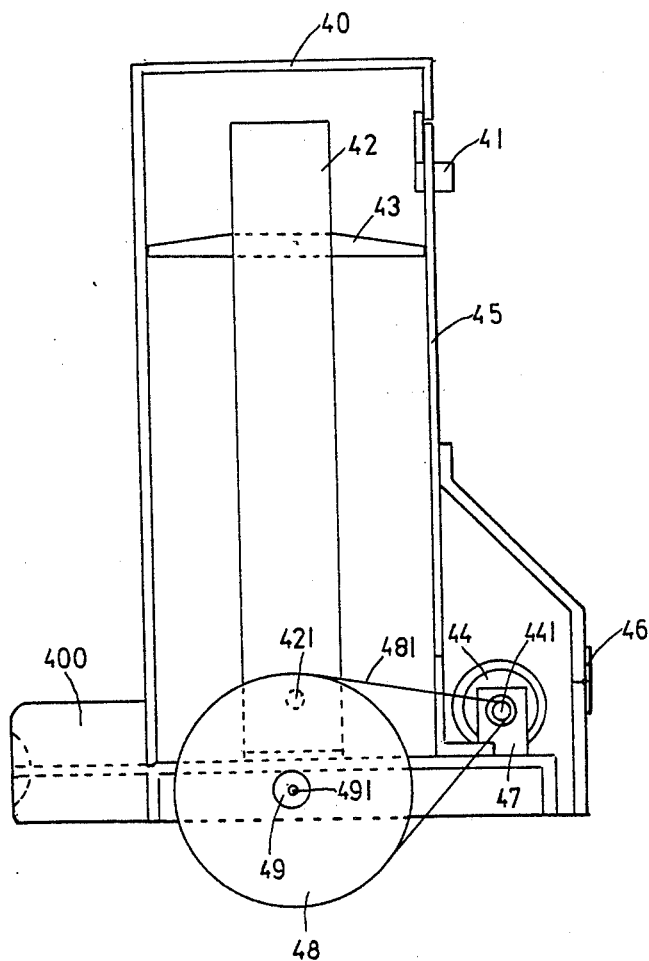
FIG. 11 has the identical description as FIG. 5 but for "version two"

Said system's debit cards 9 are used for encoding the data about company identification and charged amount on their magnetic strips. Said encoded system's debit card is further used in GPDCR's magnetic card reader/writer 21, shown on FIGS. 24 and 25, for activating said GPDCR unit and supplying the information on how much fuel can be dispensed from fuel dispensing unit. Said cards 9 are stored in AMCD's magnetic card dispensing unit 4, shown on FIGS. 5 and 6 for "version one", and on FIGS. 11 and 12 for "version two". They are released upon entered instruction that such system's debit card 9 is desired. As said cards 9 can be used infinitely (for encoding as many times as wanted), there are two possible paths to continue the procedure. The procedure when already used card 9 is applied will be described first.

Referring to FIG. 20, if already used card 9 is inserted into the magnetic and IC reader/writer 7, it is driven inside and data encoded on its magnetic strip are read, checked, erased and loaded into machine's memory. If said system's debit card 9 has proper company identification for use in said system, the procedure is continued as shown on FIG. 21, but if company identification does not correspond to one for use in said system, said card 9 is returned according to the procedure shown on FIG. 21. Referring to FIG. 21 again, if data are valid and company identification correct, new balance (comprising the erased amount and newly paid or charged amount) is encoded on said card's magnetic strip together with company identification. The card 9 is returned to customer to be further used in GPDCR unit.

As shown on FIG. 20, when instruction that new card 9 is wanted is entered on the keyboard 2 by pressing "N" key, the procedure is continued as shown on FIG. 22, wherein there are two possible paths which depend on manufacturing version of the AMCD.

Referring to FIG. 22, the procedure applied for "version one" will be described first. Upon entered instruction for new card 9, one of said system's debit cards 9 is released from the magnetic card dispensing unit 4 directly into the reader/writer 7 as shown on FIG. 6.

Referring to FIGS. 5, 6, 11 and 12, circa 260 said system's debit cards 9 are stored inside said magnetic card dispensing unit housing 40, between two lateral holders 42. Said cards 9 are inserted through unit's opening 45 which rotates on its axle 46 and is locked by its lock 41. Said cards 9 are pressed by weight 43 which can move up and down on said holders 42 and cannot be removed out of said housing 40. Said weight 43 keeps said cards 9 in proper position and pushes them downwards on the rubber cylinder 49. Said cylinder 49 rotates on its axle 491 and drives the lowest placed card 9 out of said housing 40. Said cylinder is operated by the electric motor 44 (mounted on its base 47) over the transmission belt 481 which rotates on said electric motor's belt wheel 441 and said cylinder's belt wheel 48. Both said electric motor 44 and said cylinder 49 rotate in counterclockwise manner.

Figure 7:
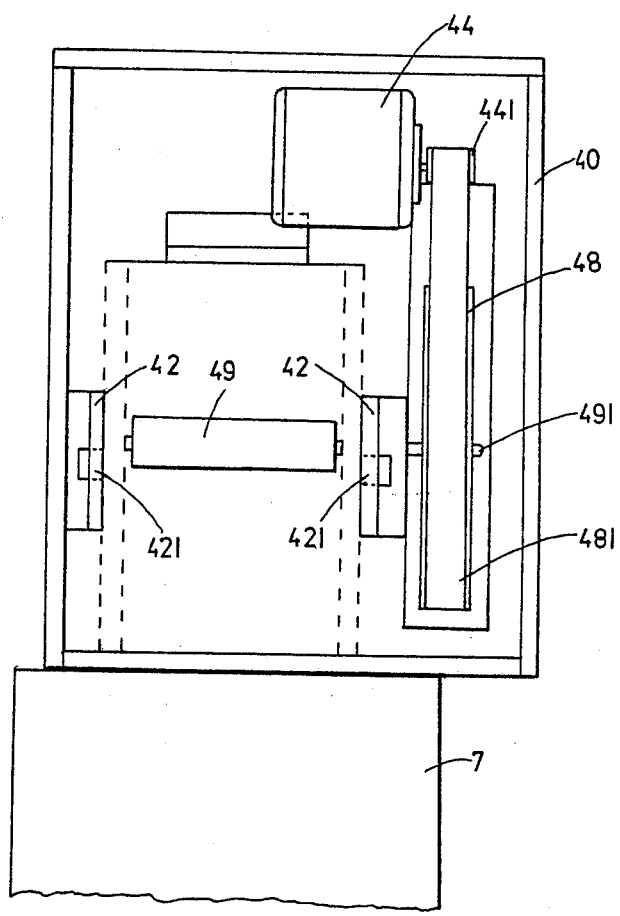
FIG. 7 is the plan view of the magnetic cards dispensing unit's card driving mechanism for "version one"

Upon entered instruction that new card 9 is wanted, said electric motor 44 is activated and said rubber cylinder 49 drives the lowest placed card 9 into said reader/writer 7 whose driving mechanism then takes said card 9 and drives it through towards its front opening. Simultaneously with said driving, said reader/writer's magnetic head encodes company identification and data about paid or charged amount on said card's 9 magnetic strip, as shown on FIG. 22. Said encoded system's debit card 9 is then retrieved by customer to be further used in GPDCR unit. Said magnetic card dispensing unit 4 also has two photosensors 421, built in said lateral holders 42 as shown on FIGS. 5, 7 and 11. Said photosensors 421 indicate to CPU 12 when amount of stored system's debit cards 9 is low, which is further indicated to maintenance people as information that said unit 4 has to be refilled. According to the process of the invention, CPU 12 stops card dispensing unit's 4 activity when there are only three said cards 9 available to be dispensed, in order to prevent possible damage of said cards 9 or unit's dispensing mechanism shown on FIG. 7.

Figure 12:
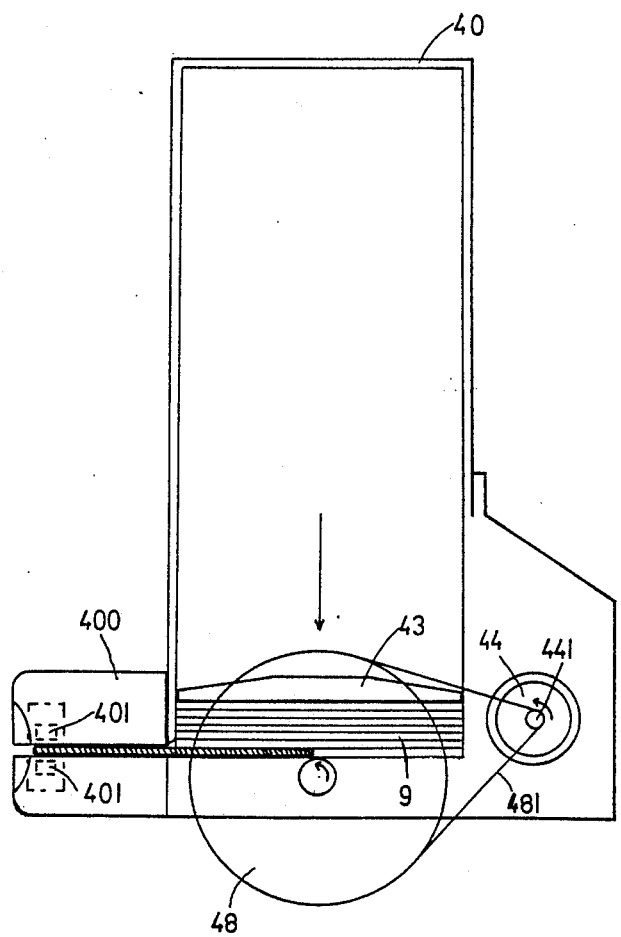
FIG. 12 has the identical description as FIG. 6, showing how (magnetic) system's debit cards are stored and dispensed to customer for "version two"
Figure 13:
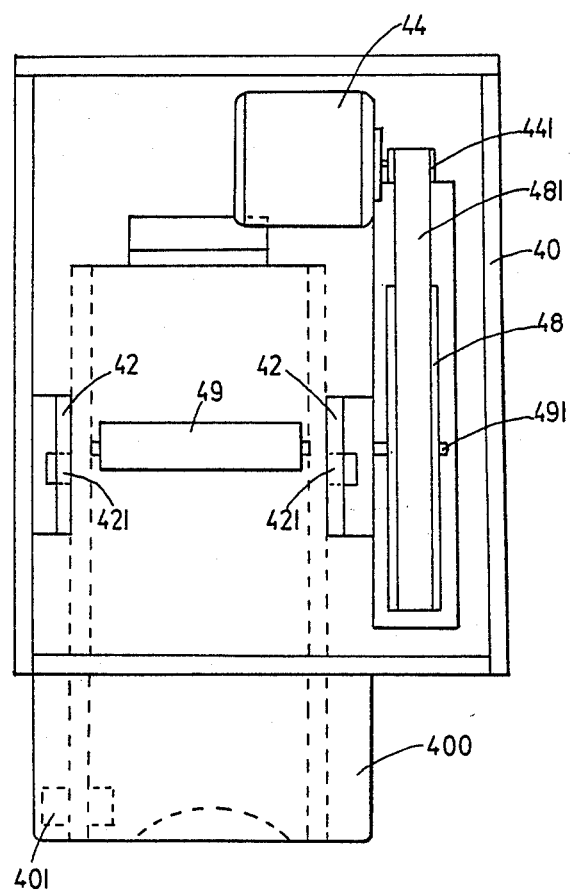
FIG. 13 has the identical description as FIG. 7 but for "version two"
Figure 14:
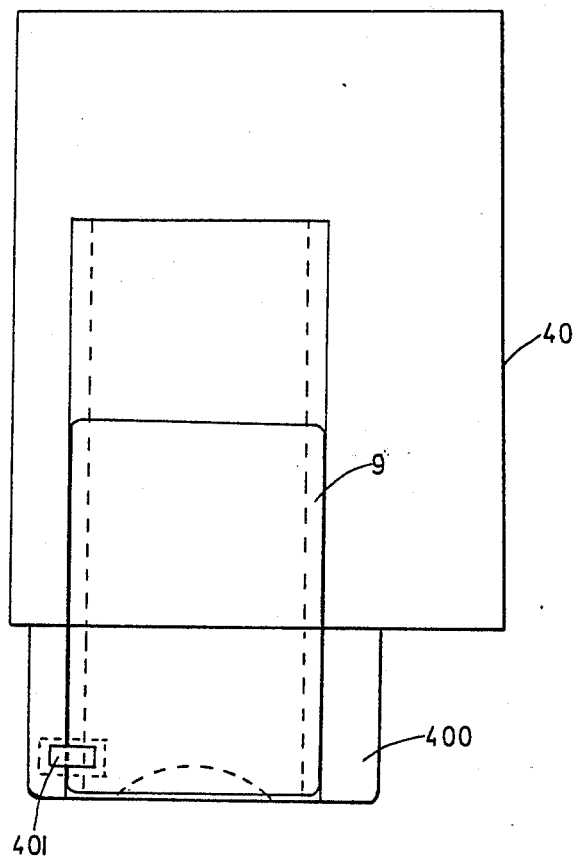
FIG. 14 is the plan view of the magnetic card dispensing unit's bottom, showing how the system's debit cards are dispensed to customer for "version two"
Figure 15:
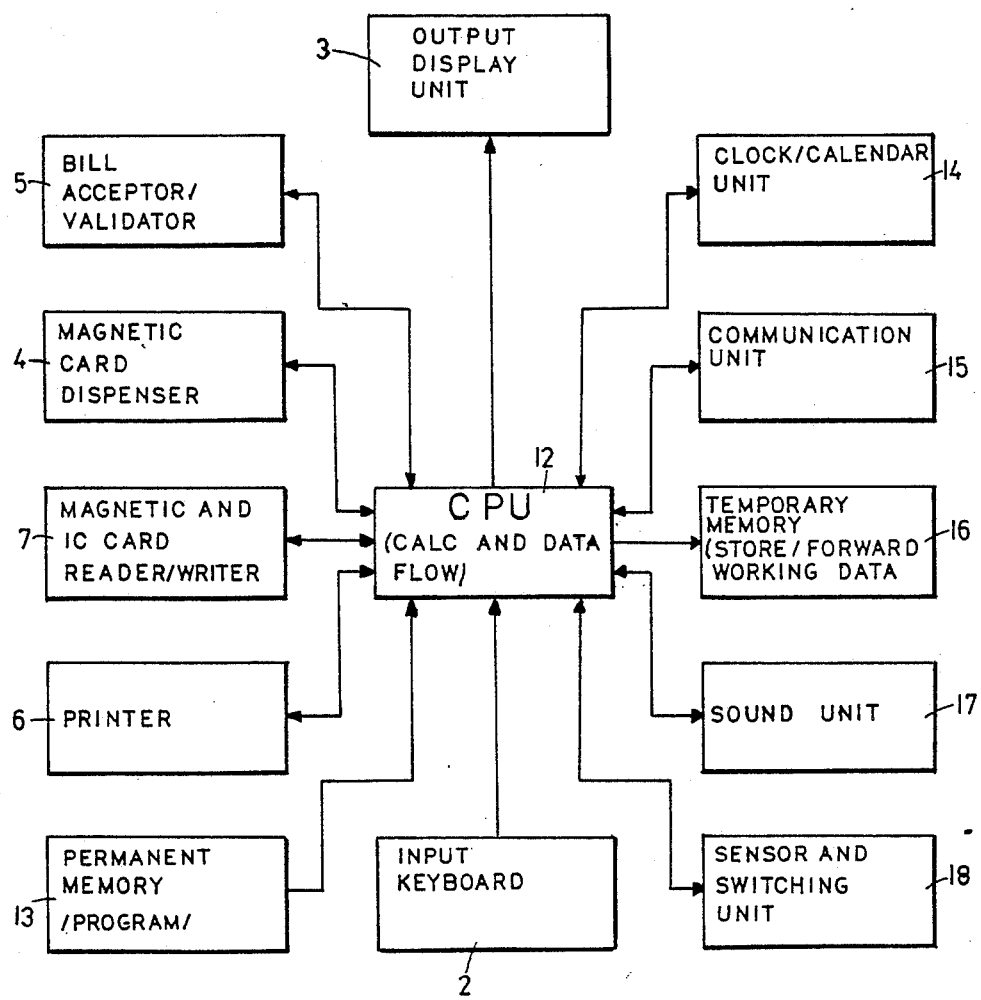
FIG. 15 is the block diagram of the AMCD in accordance with the invention.

When AMCD is manufactured in "version two", previously described dispensing procedure differs from the procedure for "version two" in the following aspects:

said system's debit card 9 is dispensed directly to customer, as shown on FIGS. 12 and 14, through the unit's front opening 400, shown on FIGS. 8, 10, 11, 12, 13 and 14;

said system's debit card is then manually retrieved from said opening 400 and manually inserted into said reader/writer's 7 front opening to be driven inside and encoded, and returned to customer.

Said magnetic card dispensing unit's front opening 400 has two built-in photosensors 401, shown on FIGS. 12, 13 and 14, which indicate to CPU 12 if dispensed card 9 is not retrieved, in order to stop further activity of unit's 4 card driving means to prevent possible damage of said means.

Figure 21:
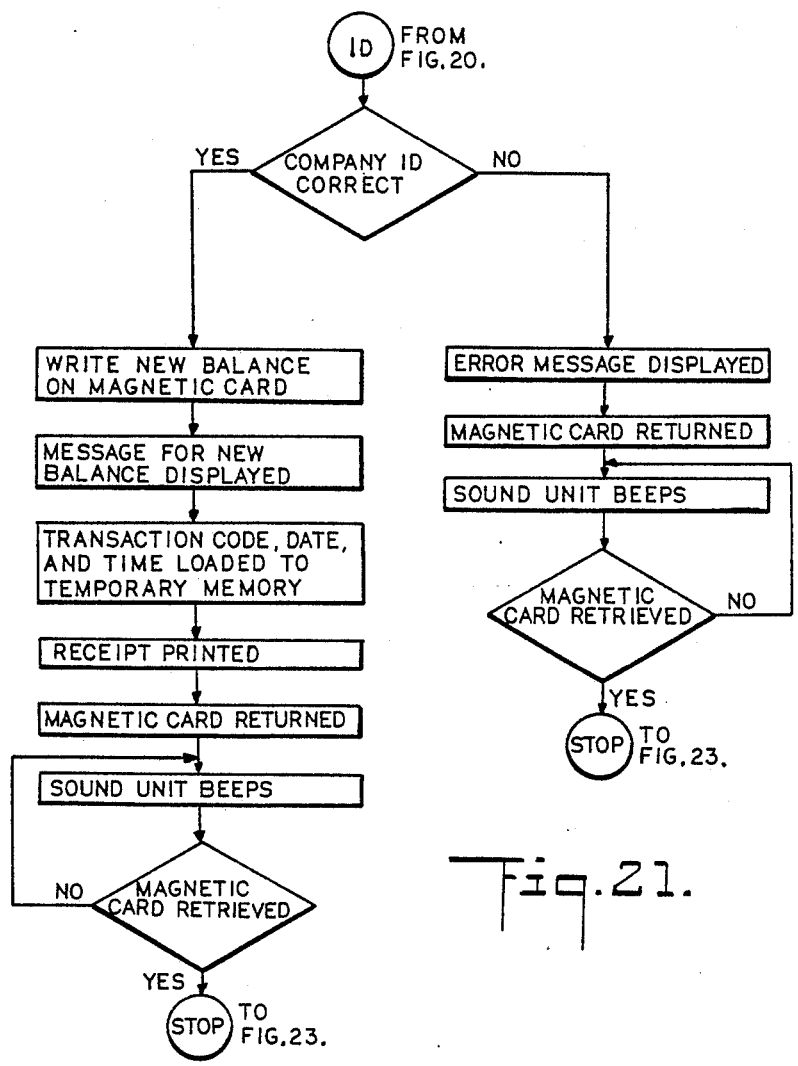

According to the process of the present invention shown on FIGS. 21, 22 and 23, when said system's debit card is encoded and retrieved from said reader/writer 7, machine dispenses the receipt for newly paid or charged amount and continues the procedure to "power-down routine" as shown on FIG. 23.

All relevant data are loaded into machine's memory of forwarded to some external database for purpose of future billing (in case of credit and IC card payment) or for any other desired purpose.

After the completed process of AMCD, customer takes said system's debit card 9 and goes to gasoline dispensing unit on which GPDCR unit is mounted.

Figure 24:
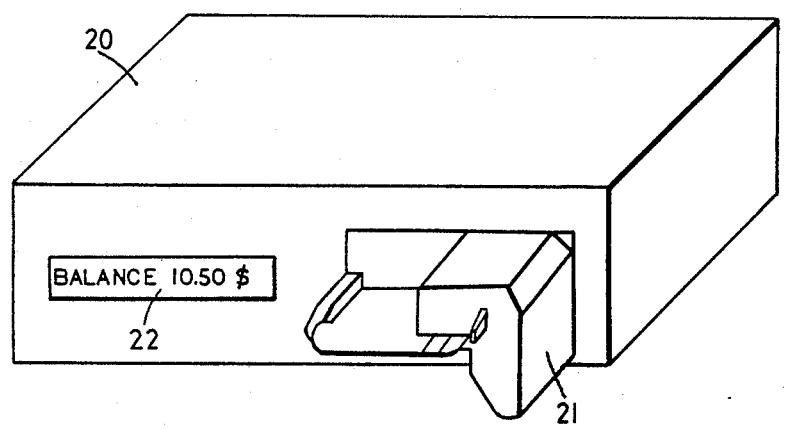
FIG. 24 is the perspective view of the GPDCR unit's housing.
Figure 25:
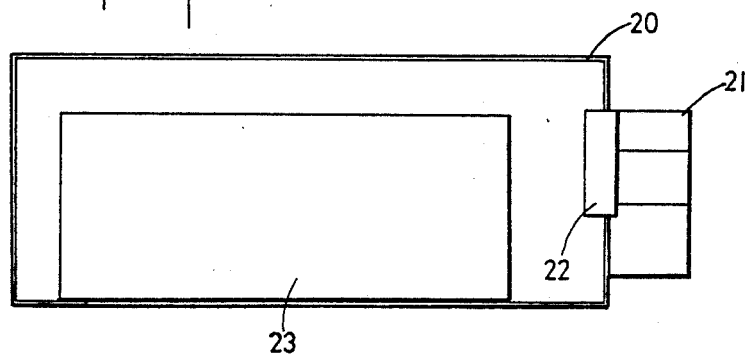
FIG. 25 is the left side view of the GPDCR unit's housing, showing the position of said unit's control box, LCD and magnetic card reader/writer.
Figure 26:
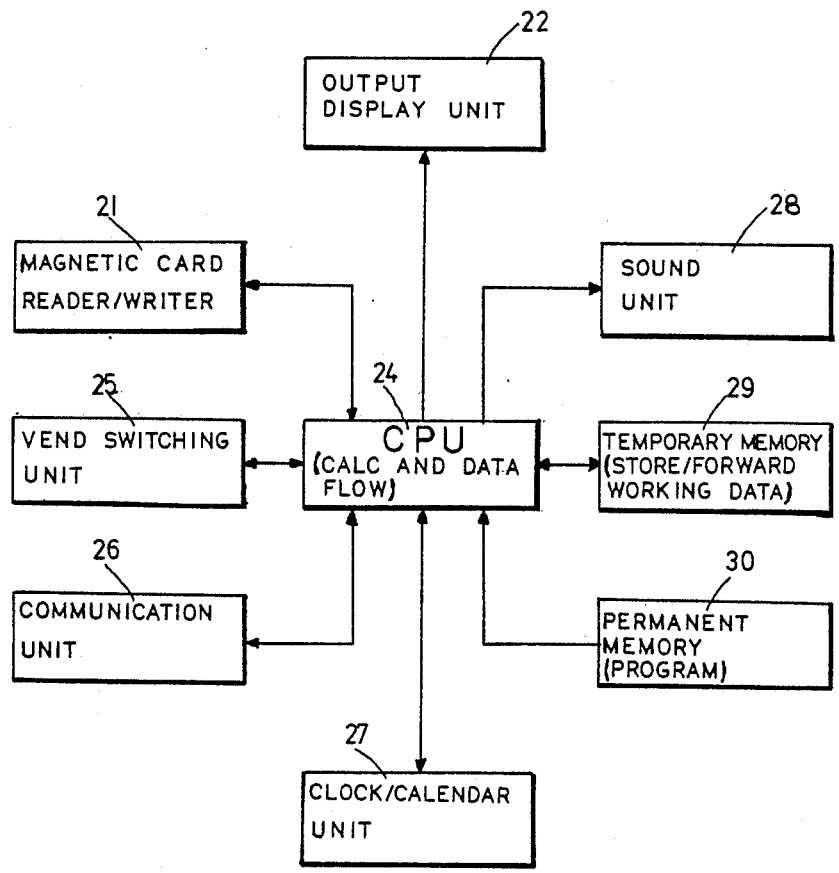
FIG. 26 is the block diagram of the GPDCR in accordance with the invention.

GPDCR unit housing 20, shown on FIGS. 24 and 25, comprises magnetic card reader/writer 21, LCD 22 and control box 23 which further comprises unit's CPU 24, vend switching unit 25, communication unit 26, clock/calendar unit 27, sound unit 28, temporary memory unit 29 and permanent memory/program unit 30.

Magnetic card reader/writer 21 built in GPDCR housing 20 is one of manual insertion type, wherein data encoded on system's debit card 9 are read and erased to be loaded into temporary memory unit 29 during the insertion of said card 9, and rewriten during the retrieval of said card.

Unit's LCD 22, shown on FIGS. 24 and 25, can display 20 characters in one line.

Figure 27:
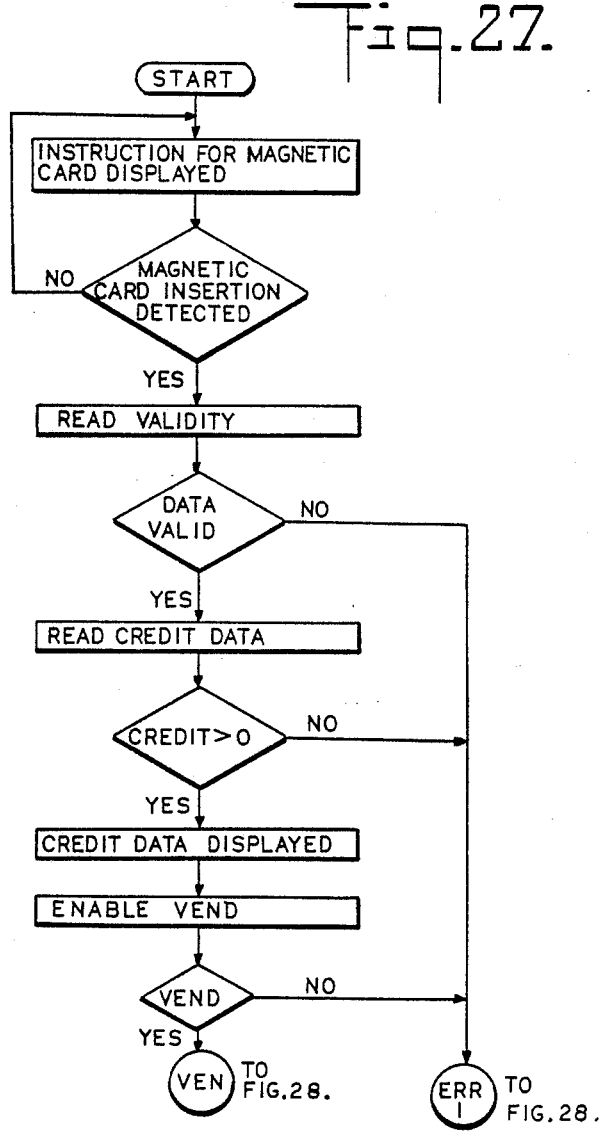
FIGS. 27 and 28 are flow charts showing the process of the GPDCR.
Figure 28:
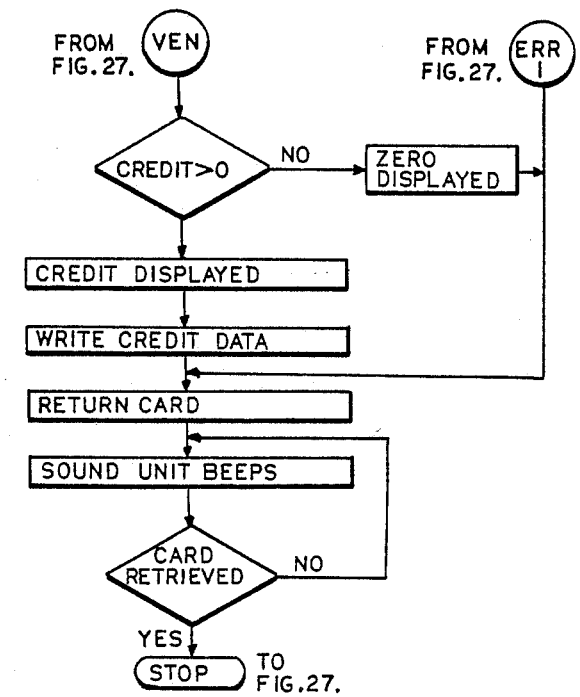

When customer inserts said system's debit card 9 into said reader/writer 21, data on said card's magnetic strip are read and erased to be loaded into temporary memory unit 29 and said card 9 is held inside said reader/writer 21 until fuel dispensing procedure is completed according to the procedure shown on FIGS. 27 and 28. If data about card validity (company identification) do not prove to be correct or credit on said card's strip is not greater than zero, said card 9 is returned according to procedure shown on FIGS. 27 and 28. Referring to FIG. 27, data about credit balance on said card 9 are displayed on LCD 22 for customer and CPU 24 further displays instructions on how to start fuel dispensing procedure. Customer himself is supposed to perform fuel dispensing procedure and CPU 24 enables said dispensing as long as credit (erased from the card) is greater than zero. As shown on FIGS. 27 and 28, this is performed through activity of vend switching unit 25 which according to instructions from CPU 24 stops fuel dispensing when credit equals zero. In case when customer or fuel dispensing pump stops fuel dispensing before credit equals zero, because of any reason (such as already full tank), said vend switching unit 25 indicates this to CPU 24 which instructs said reader/writer 21 about remaining credit and company identification to be rewritten on said card's magnetic strip. As shown on FIG. 28, said reader/writer then releases said card 9 and rewrites said data during the card's retrieval. Simultaneously, CPU 24 displays credit data on LCD 22 for customer.

If requested, data about dispensed fuel and charge for such fuel can be stored into unit's memory or through GPDCR's communication unit 26 (which is optional) can be forwarded to some external database. It has to be mentioned that, according to the process of the present invention, said system's debit card 9 cannot be retrieved unless fuel dispensing nozzle is properly returned into its position on the pump's housing. It is also to be mentioned that in every case when one of said debit, credit or IC cards is relased to be retrieved from any of said reader/writers 7 and 21, sound units 17 and 28 beep to warn the customer and repeat beeping if card is not retrieved for a given period of time. This procedure is also applied when bill acceptor/validator 5 returns invalid bill and can be applied in case of some other iregularities.

It will be understood that the present invention has been described in relation to the particular embodiment, herein chosen for the purpose of illustration and that the claims are intended to cover all changes and modifications, apparent to those skilled in the art, which do not constitute departure from the scope and spirit of the invention.

What is claimed is:

1. An automated system for controlling the operation of an electronically controllable fuel dispensing pump comprising:
   automated system's debit card vending apparatus;
   automated system's debit card reading and processing apparatus;
   both said apparatuses adapted for use by a customer.

2. The automated system according to claim 1 further comprising a magnetically encoded system's debit card for transmitting data about payment and controlling the process of a fuel dispensing unit, said system's debit card issued by the process of said automated system's debit card vending apparatus and used for operating said automated system's debit card reading and processing apparatus.

3. The automated system according to claim 1 wherein said automated system's debit card vending apparatus is built in a hard protective embodiment of a station's office building, and wherein said automated system's debit card reading and processing apparatus is mounted on a fuel dispensing unit for controlling fuel flow through a single dispensing nozzle.

4. The automated system according to claim 1 wherein said automated system's debit card vending apparatus comprises:
   computer means;
   means for automated starting and terminating the process of said apparatus coupled to said computer means;
   data entry means coupled to said computer means for entering data relating to the process of said apparatus;
   display means coupled to said computer means, to said means for automated starting and terminating the process of said apparatus, and to said data entry means, said display means displaying instructions for using said apparatus;
   currency accepting means coupled to said computer means, to said data entry means, and to said display means, said currency accepting means detecting the presence of currency, loading said currency, validating said currency, counting said currency, and storing or returning said currency;
   credit, IC or system's debit cards processing means coupled to said computer means, to said data entry means, to said display means, and to said currency accepting means, said cards processing means detecting the presence of credit, IC or system's debit cards, loading said cards, reading said cards, validating said cards, charging said credit or IC cards, returning said credit or IC cards, encoding or re-encoding said system's debit cards, and dispensing said system's debit cards;
   system's debit cards storing and loading means for storing said cards and loading said cards into the reader/writer or dispensing said cards to a customer coupled to said computer means, to said data entry means, to said display means to said currency accepting means, and to said credit, IC or system's debit cards processing means;
   warning means coupled to said computer means, to said display means, to said currency accepting means, to said credit, IC or system's debit cards processing means, to said system's debit cards storing and loading means, said warning means warning a customer in the case of inadequately performed procedure and an operator in the case when system's debit card refilling is required;
   control means coupled to said computer means, to said data entry means, to said display means, to said currency accepting means, to said credit, IC or system's debit cards processing means, to said system's debit cards storing and loading means, and to said warning means, said control means controlling the process of said apparatus;
   printing means coupled to said computer means, to said data entry means, to said currency accepting means, to said credit, IC or system's debit cards processing means, said printing means printing and dispensing receipts to customer;
   data storing and transmitting means for storing and transmitting data about cash payment, credit or IC cards charges, and system's debit cards issuance coupled to said computer means, to said data entry means, to said currency accepting means, to said credit, IC or system's debit cards processing means, to said system's debit cards storing and loading means, to said control means, and to said printing means.

5. The automated system according to claim 1 wherein said automated system's debit card reading and processing apparatus comprises:

computer means;

system's debit cards accepting and processing means coupled to said computer means for detecting the presence of said system's debit cards, for loading said cards, for reading said cards, for validating said cards, for charging said cards, and for returning said cards;

display means coupled to said computer means, and to said system's debit cards accepting and processing means, said display means displaying instructions for using said apparatus and data about a customer's card balance;

control means coupled to said computer means, to said system's debit cards accepting and processing means, and to said display means, said control means controlling the process of said apparatus and providing instructions to fuel flow (vend) controlling means;

warning means coupled to said computer means, to said system's debit cards accepting and processing means, to said display means, and to said control means, said warning means warning a customer in the case of inadequately performed procedure;

data storing and transmitting means coupled to said computer means, to said system's debit cards accepting and processing means, and to said control means for gathering, storing and transmitting data about fuel dispensing.

* * * * *